(12) United States Patent
Ueno et al.

(10) Patent No.: US 10,173,370 B2
(45) Date of Patent: Jan. 8, 2019

(54) JOINING METHOD

(71) Applicant: TOYOTA JIDOSHA KABUSHIKI KAISHA, Toyota-shi, Aichi-ken (JP)

(72) Inventors: Yasuhiro Ueno, Miyoshi (JP); Takaaki Kiyono, Okazaki (JP); Toyokazu Hirota, Okazaki (JP); Koichi Inazawa, Miyoshi (JP); Tatsuro Nakata, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 306 days.

(21) Appl. No.: 15/128,565

(22) PCT Filed: Mar. 26, 2015

(86) PCT No.: PCT/IB2015/000466
§ 371 (c)(1),
(2) Date: Sep. 23, 2016

(87) PCT Pub. No.: WO2015/145253
PCT Pub. Date: Oct. 1, 2015

(65) Prior Publication Data
US 2017/0136686 A1 May 18, 2017

(30) Foreign Application Priority Data
Mar. 26, 2014 (JP) ................. 2014-063611

(51) Int. Cl.
*B32B 37/00* (2006.01)
*B29C 65/06* (2006.01)
(Continued)

(52) U.S. Cl.
CPC ............ *B29C 65/06* (2013.01); *B21D 39/032* (2013.01); *B21J 15/027* (2013.01); *B21K 25/005* (2013.01);
(Continued)

(58) Field of Classification Search
CPC .... B21D 39/032; B21J 15/027; B21K 25/005; B23K 20/1255; B23K 20/127;
(Continued)

(56) References Cited

U.S. PATENT DOCUMENTS 4,763,397 A 8/1988 Tsukayama et al.
8,048,246 B2 * 11/2011 Perez Madueno ..... B23K 20/10
156/580.2

(Continued)

FOREIGN PATENT DOCUMENTS

CN 101309775 B 6/2011
DE 102009018151 A1 10/2010
(Continued)

OTHER PUBLICATIONS

International Search Report and Written Opinion dated Jul. 1, 2015 in PCT Application No. PCT/IB2015/000466.

*Primary Examiner* — James D Sells
(74) *Attorney, Agent, or Firm* — Sughrue Mion, PLLC

(57) ABSTRACT

A joining method for joining a first member having a hole that is opened on at least one surface, to a second member including a material of which a melting temperature is lower than that of a constituent material of the first member, includes: laminating the second member on the first member so as to cover an opening of the hole; and introducing that material of the second member which is softened or melted into the hole through the opening and curing the material of the second member.

8 Claims, 14 Drawing Sheets

(51) Int. Cl.
| | |
|---|---|
| *B21D 39/03* | (2006.01) |
| *B21J 15/02* | (2006.01) |
| *B23K 20/12* | (2006.01) |
| *B29C 65/60* | (2006.01) |
| *B29C 65/64* | (2006.01) |
| *B29C 65/78* | (2006.01) |
| *B29C 65/00* | (2006.01) |
| *B29C 65/02* | (2006.01) |
| *F16B 5/04* | (2006.01) |
| *F16B 5/08* | (2006.01) |
| *B23K 20/22* | (2006.01) |
| *B23K 20/233* | (2006.01) |
| *B21K 25/00* | (2006.01) |
| *B23K 103/16* | (2006.01) |
| *B23K 103/18* | (2006.01) |
| *B23K 103/00* | (2006.01) |

(52) U.S. Cl.
CPC ........ *B23K 20/127* (2013.01); *B23K 20/1255* (2013.01); *B23K 20/22* (2013.01); *B23K 20/233* (2013.01); *B29C 65/02* (2013.01); *B29C 65/0681* (2013.01); *B29C 65/606* (2013.01); *B29C 65/608* (2013.01); *B29C 65/64* (2013.01); *B29C 65/7841* (2013.01); *B29C 66/1122* (2013.01); *B29C 66/21* (2013.01); *B29C 66/41* (2013.01); *B29C 66/45* (2013.01); *B29C 66/72143* (2013.01); *B29C 66/73116* (2013.01); *B29C 66/81431* (2013.01); *B29C 66/8322* (2013.01); *F16B 5/045* (2013.01); *F16B 5/08* (2013.01); *B23K 2103/16* (2018.08); *B23K 2103/18* (2018.08); *B23K 2103/42* (2018.08); *B29C 66/71* (2013.01); *B29C 66/7212* (2013.01); *B29C 66/742* (2013.01)

(58) Field of Classification Search
CPC ...... B23K 20/22; B23K 20/233; B29C 65/06; B29C 65/02; B29C 65/0681; B29C 65/606; B29C 65/608; B29C 65/64; B29C 65/7841; B29C 66/1122; B29C 66/21; B29C 66/41; B29C 66/45; B29C 66/72143; B29C 66/73116; B29C 66/81431; B29C 66/8322; F16B 5/045; F16B 5/08
USPC ....................................................... 156/73.5
See application file for complete search history.

(56) References Cited

U.S. PATENT DOCUMENTS

| | | |
|---|---|---|
| 8,632,646 B2 | 1/2014 | Suigetsu |
| 2007/0158011 A1* | 7/2007 | Tominaga ............... B29C 65/08 156/73.1 |
| 2009/0236028 A1 | 9/2009 | Fukuda |
| 2010/0189958 A1* | 7/2010 | Naritomi ........... B29C 45/14311 428/141 |
| 2010/0237610 A1 | 9/2010 | Suigetsu |
| 2010/0242255 A1 | 9/2010 | Suigetsu |

FOREIGN PATENT DOCUMENTS

| | | |
|---|---|---|
| DE | 102013211580 A1 | 12/2013 |
| EP | 1949999 A1 | 7/2008 |
| JP | 62-207629 A | 9/1987 |
| JP | 09-314669 A | 12/1997 |
| JP | 11-173356 A | 6/1999 |
| JP | 2007-136505 A | 6/2007 |
| JP | 2008-162115 A | 7/2008 |
| JP | 2008-213379 A | 9/2008 |
| JP | 2011-005507 A | 1/2011 |
| JP | 2012-196680 A | 10/2012 |
| JP | 2013-123801 A | 6/2013 |
| WO | 03/026816 A1 | 4/2003 |

* cited by examiner

FIG. 7A
FIG. 7B
FIG. 7C
FIG. 7D
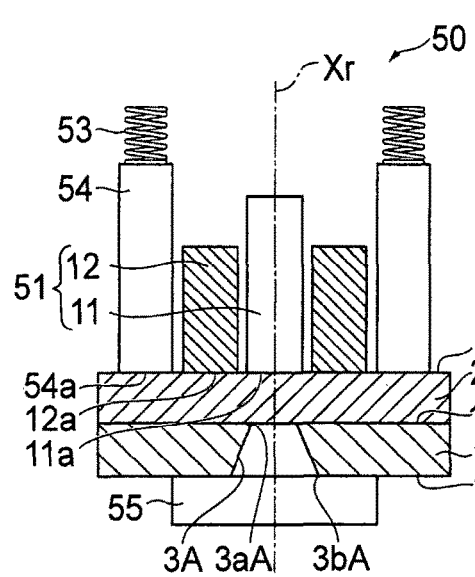
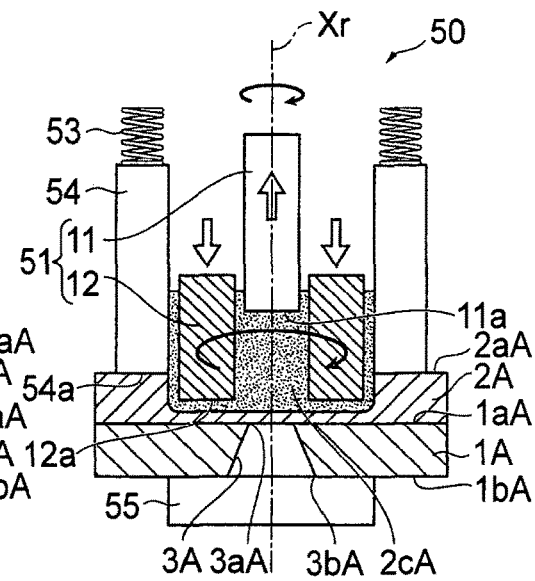
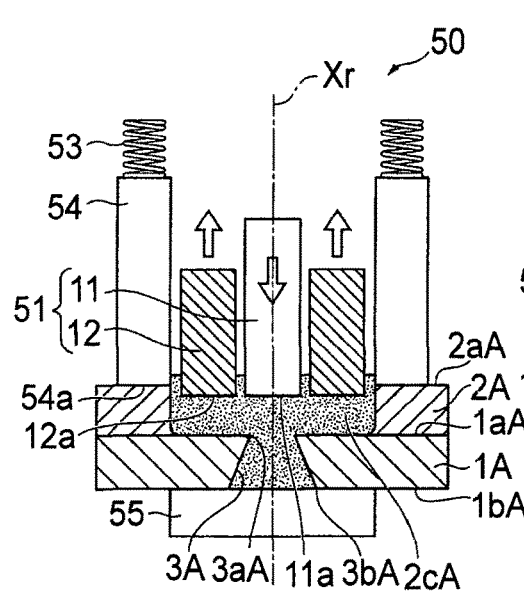
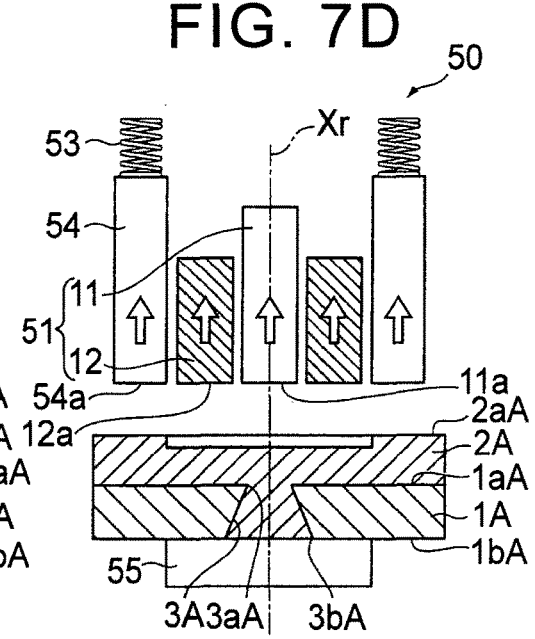

FIG. 13A
FIG. 13B
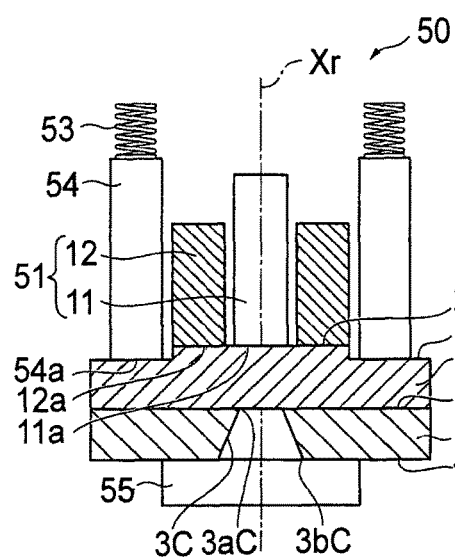
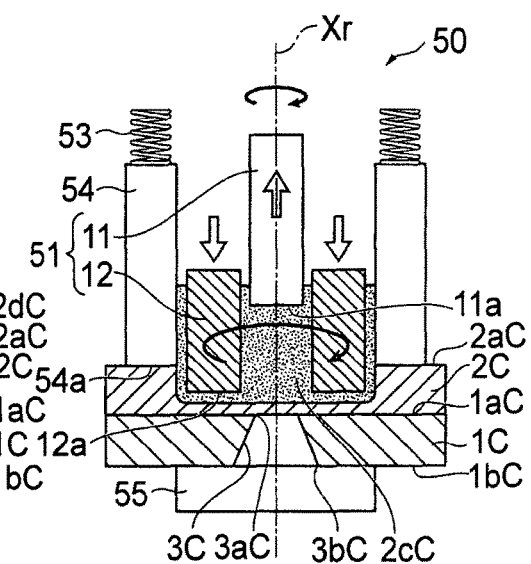
FIG. 13C
FIG. 13D
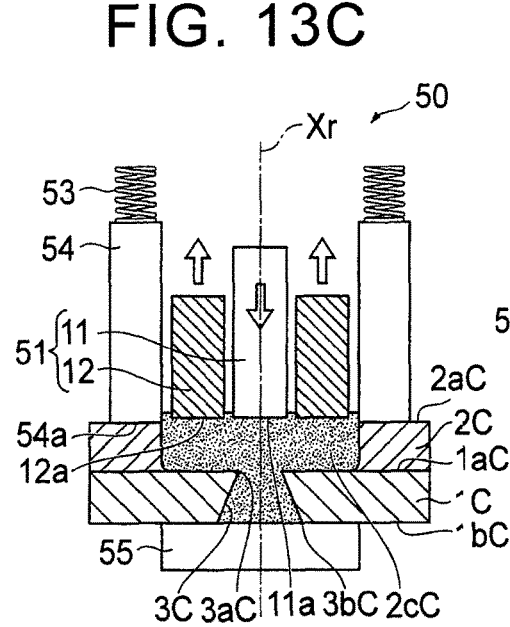
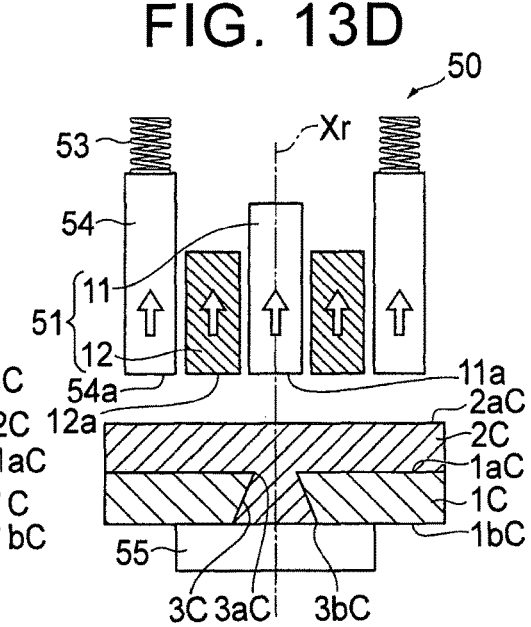

JOINING METHOD

BACKGROUND OF THE INVENTION

1. Field of the Invention

The present invention relates to a joining method, specifically to a joining method for joining different types of members to each other, e.g., a metal member to a metal member, a metal member to a resin member, and a resin member to a resin member.

2. Description of Related Art

As a method for joining different types of members of a metal member, a resin member, and the like, for example, there have been known a method using an adhesive (e.g., Japanese Patent Application Publication No. 11-173356 (JP 11-173356 A)) and a method using a fastening member such as a rivet or a screw. However, the former method has a problem that it takes time to cure the adhesive, and a problem that adhesive strength could be decreased due to aged deterioration and the like of the adhesive. Further, the latter method has a problem that a product weight is increased due to the rivet, the screw, or the like, and a problem that it takes time and man-hours to fasten the rivet, the screw, or the like.

In order to deal with such a problem, Japanese Patent Application Publication No. 2008-162115 (JP 2008-162115 A) and Japanese Patent Application Publication No. 2008-213379 (JP 2008-213379 A) describe a technique to join a metal member to a resin member more reasonably without using the adhesive or the fastening member.

The joining method disclosed in JP 2008-162115 A is a method in which thermo plastic resin is injected on a surface of metal on which a fine porous hydroxyl-group containing film is formed, so that the metal is integrated with the thermo plastic resin via the film.

Further, the joining method described in JP 2008-213379 A is a method including: a base portion preparation step of preparing a metal base portion; a recessed portion forming step of, after the base portion preparation step, forming a recessed portion having an opening on at least part of a surface of the base member and having an internal space extending toward a lower side of at least part of a peripheral part of the opening so as to form an overhang; and a coating portion forming step of, after the recessed portion forming step, forming a coating portion made of resin and including a merging portion that fills the recessed portion, and a skin portion integrated with the merging portion and covering the surface of the base portion.

In the joining method described in JP 2008-162115 A, the thermo plastic resin is injected on the surface of the metal on which the fine porous hydroxyl-group containing film is formed, so that the metal is integrated with the thermo plastic resin via the film. Accordingly, due to an anchor effect and a chemical operation of the fine porous hydroxyl-group containing film, the metal can be integrated with the thermo plastic resin with sufficient joining strength. Further, such a hydroxyl-group containing film can be formed easily at a low cost without using hydrazine, by performing a hot-water process on the surface of the metal. Accordingly, it is possible to safely manufacture a complex in which the metal and the thermo plastic resin molded in desired shapes are formed integrally with each other, at low cost without any bad smell.

Further, in the joining method described in JP 2008-213379 A, the recessed portion having an overhang structure, and the merging portion entering the recessed portion to fill the recessed portion are formed in the base portion of the coating portion. Accordingly, an anchor effect is obtained by the recessed portion and the merging portion, so that a resisting force occurs due to the anchor effect and a contraction stress by thermal expansion and the like of the coating portion is restrained. As a result, the skin portion formed integrally with the merging portion makes close contact with the surface of the base portion, thereby making it possible to prevent detachment of the coating portion from the surface of the base portion.

However, in the joining method described in JP 2008-162115 A, after the fine porous hydroxyl-group containing film is formed on the surface of the metal, it is necessary to inject the thermo plastic resin onto the surface. This may cause such a problem that its manufacturing process becomes complicated and a manufacturing cost is increased.

Also, in the joining method described in JP 2008-213379 A, how to form the coating portion made of resin and including the merging portion that fills the recessed portion and the skin portion formed integrally with the merging portion so as to cover the surface of the base portion is not specified concretely, and how the merging portion is caused to enter the internal space of the recessed portion is not mentioned at all.

SUMMARY OF THE INVENTION

The present invention provides a joining method for easily joining different types of members, e.g., a metal member to a metal member, a metal member to a resin member, and a resin member to a resin member, at low cost.

A first aspect of the present invention relates to a joining method for joining a first member having a hole that is opened on at least one surface, to a second member including a material of which a melting temperature is lower than that of a constituent material of the first member. The joining method includes: laminating the second member on the first member so as to cover an opening of the hole; and introducing that material of the second member which is softened or melted into the hole through the opening and curing the material of the second member.

In the joining method described above, the second member is laminated on the first member so as to cover the opening of the hole provided in the first member, and that material of the second member which is softened or melted is introduced into the hole of the first member through the opening of the hole and then cured. This makes it possible to easily join the first member and the second member, which are different types of members, at low cost.

Here, the introducing and curing of the material of the second member may include softening or melting of the material of the second member, introducing of the softened or melted material of the second member, into the hole through the opening, and curing of the material thus introduced into the hole.

That is, in the joining method described above, the material of the second member is introduced into the hole of the first member through the opening of the hole after the material of the second member is softened or melted, and then, the material of the second member thus introduced into the hole is cured. This makes it possible to more surely join the first member and the second member, which are different types of members.

Further, in the above aspect, the second member may be made of a fiber reinforced resin member configured such that a fiber material is mixed in resin of which the melting temperature is lower than that of the constituent material of the first member.

In the joining method described above, the second member is made of a fiber reinforced resin member configured such that a fiber material is mixed in resin of which the melting temperature is lower than that of the constituent material of the first member. Accordingly, in the introducing and curing of the material of the second member, when the softened or melted resin of the second member is introduced into the hole of the first member through the opening of the hole, the fiber material contained in the second member is oriented in the laminating direction in the vicinity of the opening of the hole. This makes it possible to effectively increase joining strength between the first member and the second member.

Further, in the above aspect, the hole of the first member may have a reduced diameter portion reduced in diameter continuously or in a stepped manner toward the opening.

In the joining method described above, the hole of the first member has the reduced diameter portion reduced in diameter continuously or in a stepped manner toward the opening. This makes it possible to effectively increase the joining strength between the first member and the second member due to an anchor effect of the reduced diameter portion.

Further, in the above aspect, a sectional area of the hole of the first member along a direction perpendicular to a laminating direction may be minimized at the opening.

In the joining method described above, the sectional area of the hole of the first member along the direction perpendicular to the laminating direction is minimized at the opening. This makes it possible to surely restrain the second member from falling off from the first member and to surely join the first member to the second member.

Further, in the above aspect, the hole of the first member may be formed so as to penetrate from the one surface to the other surface opposite to the one surface.

In the joining method described above, the hole of the first member is formed so as to penetrate from the one surface to the other surface. Accordingly, in the introducing and curing of the material of the second member, when the softened or melted resin of the second member is introduced into the hole of the first member through that opening of the hole which is formed on the one surface, gas such as air or the like that remains in the hole can be removed through an opening on the other surface, thereby making it possible to more effectively increase the joining strength between the first member and the second member.

As understood from the above, in the joining method according to the first aspect of the present invention, in a case of joining different types of members to each other, e.g., a metal member to a metal member, a metal member to a resin member, and a resin member to a resin member, for example, it is possible to easily join the different types of members to each other to each other at low cost without using an adhesive or a fastening member, by performing such an extremely simple method in which the second member is laminated on the first member so as to cover the opening of the hole provided in the first member, and the softened or melted material of the second member is introduced into the hole of the first member through the opening of the hole and then cured.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7A is a drawing of a longitudinal section to describe Embodiment 4 of the joining method of the present invention, and describes a laminating step thereof;

FIG. 7B is a drawing of a longitudinal section to describe Embodiment 4 of the joining method of the present invention, and describes a softening-melting step thereof;

FIG. 7C is a drawing of a longitudinal section to describe Embodiment 4 of the joining method of the present invention, and describes an introducing step thereof;

FIG. 7D is a drawing of a longitudinal section to describe Embodiment 4 of the joining method of the present invention, and describes a curing step thereof;

FIG. 13A is a drawing of a longitudinal section to describe Embodiment 6 of the joining method of the present invention, and describes a laminating step thereof;

FIG. 13B is a drawing of a longitudinal section to describe Embodiment 6 of the joining method of the present invention, and describes a softening-melting step thereof;

FIG. 13C is a drawing of a longitudinal section to describe Embodiment 6 of the joining method of the present invention, and describes an introducing step thereof;

FIG. 13D is a drawing of a longitudinal section to describe Embodiment 6 of the joining method of the present invention, and describes a curing step thereof;

DETAILED DESCRIPTION OF EMBODIMENTS

With reference to drawings, the following describes embodiments of a joining method of the present invention.

[Embodiment 1]

FIG. 1 is a drawing of a longitudinal section to describe Embodiment 1 of the joining method of the present invention: FIG. 1A is a view to describe a laminating step thereof; FIG. 1B and FIG. 1C are views to describe a softening-melting/introducing step thereof; and FIG. 1D is a view to describe a curing step thereof.

<Joining Apparatus Used in Embodiment 1 of Joining Method of Present Invention>

Figure 1A:
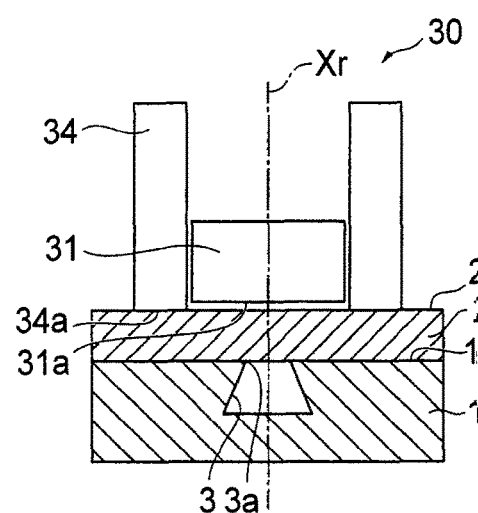
FIG. 1A is a drawing of a longitudinal section to describe Embodiment 1 of a joining method of the present invention, and describes a laminating step thereof.

The joining method according to Embodiment 1 of the present invention is performed by use of a joining apparatus including a heater. The joining apparatus 30 mainly includes a heater 31, and a clamping member 34, as illustrated in FIG. 1A, and also includes support members that support these members, and so on, although not illustrated in FIG. 1A. The clamping member 34 has a tubular shape (e.g., a generally cylindrical shape) having a hollow, for example, and the heater 31 as heating means is inserted into the hollow. The clamping member 34 is supported by the support member (not shown) via a spring (not shown), for example, so as to press a workpiece (a second member 2) from its one surface (a top face in FIG. 1A).

The heater 31 and the clamping member 34 configured as such include an abutting surface 31a and an abutting surface 34a, respectively. The abutting surface 34a of the clamping member 34 is moved by a drive mechanism (not shown) in an axis-Xr direction so as to abut with the one surface of the workpiece. The abutting surface 31a of the heater 31 is moved by a drive mechanism (not shown) in the axis-Xr direction to a slightly upper side of the one surface of the workpiece.

<Joining Method Using Joining Apparatus>

Next will be generally described the joining method using the joining apparatus 30 according to Embodiment 1, with reference to FIG. 1. Embodiment 1 specifically describes a method in which a generally flat-shaped first member 1 made of a metal member, a resin member, a wood material, or the like having a generally recessed hole 3 that is opened on one surface (a top face in FIG. 1) 1a is joined to a generally flat-shaped second member 2 made of a metal member, a resin member, or the like including a material of which a melting temperature is lower than that of a constituent material of the first member 1.

The joining method according to Embodiment 1 mainly includes a laminating step, a softening-melting/introducing step, and a curing step.

First, in the laminating step, the second member 2 is laminated on the first member 1 so as to cover an opening 3a of the hole 3 provided in the first member 1, as illustrated in FIG. 1A. Subsequently, the joining apparatus 30 is positioned and disposed on a top face 2a of the second member 2, so that the opening 3a of the hole 3 of the first member 1 is placed on the axis Xr, in other words, the heater 31 is placed above the opening 3a of the hole 3 of the first member 1 and one surface (the top face in FIG. 1) 2a of the second member 2 abuts with the abutting surface 34a of the clamping member 34. Note that the first member 1 is supported by a support member (not shown), and the second member 2 is supported in such a manner that the second member 2 is pressed against the first member 1 by the clamping member 34.

Figure 1B:
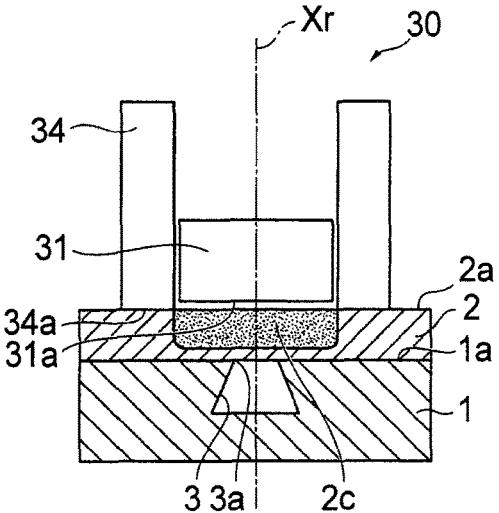
FIG. 1B is a drawing of a longitudinal section to describe Embodiment 1 of the joining method of the present invention, and describes a softening-melting/introducing step thereof.
Figure 1C:
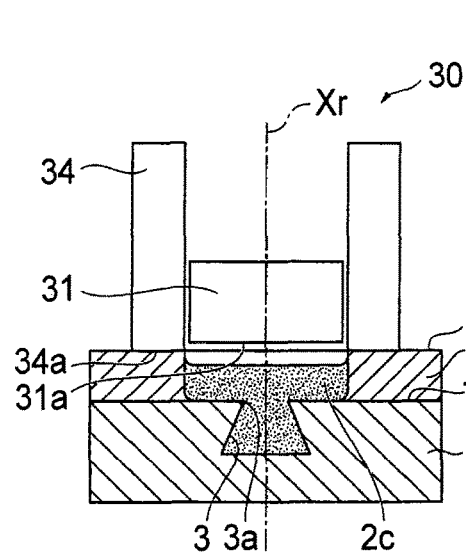
FIG. 1C is a drawing of a longitudinal section to describe Embodiment 1 of the joining method of the present invention, and describes the softening-melting/introducing step thereof.

Then, in the softening-melting/introducing step, a constituent material of the second member 2, particularly a constituent material of that part of the second member 2 which is placed on the hole 3 of the first member 1 is softened or melted by use of heat of the heater 31, as illustrated in FIG. 1B. A softened or melted constituent material 2c of the second member 2 is introduced into the hole 3 through the opening 3a by gravity (by its own weight), as illustrated in FIG. 1C.

Figure 1D:
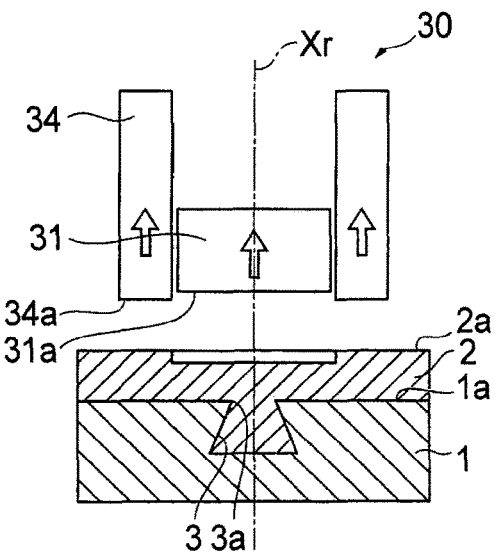
FIG. 1D is a drawing of a longitudinal section to describe Embodiment 1 of the joining method of the present invention, and describes a curing step thereof.

Further, in the curing step, as illustrated in FIG. 1D, the softened or melted constituent material 2c of the second member 2 (that constituent material of the second member 2 which is introduced into the hole 3 of the first member 1 and that constituent material of the second member 2 which remains on the top face 1a of the first member 1 around the hole 3) is cured so that the first member 1 is integrated with the second member 2, and then, the joining apparatus 30 is removed from the top face 2a of the second member 2.

Thus, the joining method of Embodiment 1 is performed such that: the second member 2 is laminated on the first member 1 so as to cover the opening 3a of the hole 3 provided in the first member 1; the constituent material of that part of the second member 2 which is placed on the opening 3a of the hole 3 is locally softened or melted by use of heat of the heater 31; the softened or melted constituent material 2c of the second member 2 is introduced into the hole 3 of the first member 1 through the opening 3a of the hole 3; and the constituent material 2c of the second member 2 thus introduced into the hole 3 is cured. This makes it possible to easily join the first member 1 and the second member 2, which are different type of members, at low cost.

[Embodiment 2]

FIG. 2 is a drawing of a longitudinal section to describe Embodiment 2 of the joining method of the present invention: FIG. 2A is a view to describe a laminating step thereof; FIG. 2B and FIG. 2C are views to describe a softening-melting/introducing step thereof; and FIG. 2D is a view to describe a curing step thereof.

<Friction Stir Welding Apparatus Used in Embodiment 2 of Joining Method of Present Invention>

The joining method according to Embodiment 2 of the present invention is performed by use of a single acting friction stir welding apparatus as an example of a friction stir welding apparatus. On that account, initially, the following generally describes an example of the single acting friction stir welding (FSW) apparatus used in the joining method according to Embodiment 2, with reference to FIG. 2A.

Figure 2A:
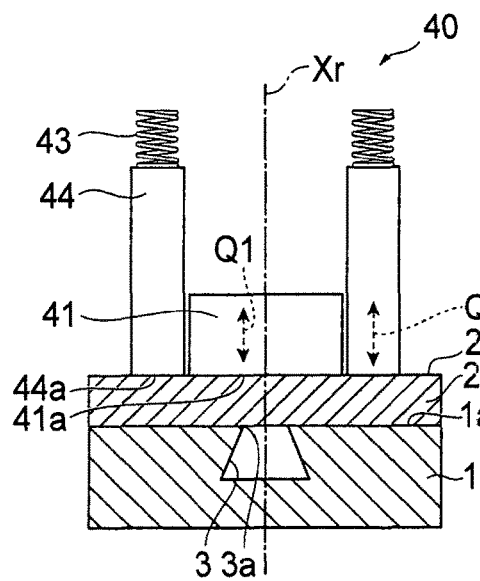
FIG. 2A is a drawing of a longitudinal section to describe Embodiment 2 of the joining method of the present invention, and describes a laminating step thereof.

As illustrated in FIG. 2A, the FSW apparatus 40 used in the joining method according to Embodiment 2 mainly includes a rotating tool portion 41 and a clamping member 44, and also includes support members that support these members, a drive mechanism that drives the rotating tool portion 41, and so on, although not illustrated in FIG. 2A. The clamping member 44 is fixed to the support member (not shown) via a spring 43.

The rotating tool portion 41 has a generally circular column shape. The rotating tool portion 41 is configured to be rotated by the drive mechanism (not shown) around an axis (a rotating axis) Xr and to be slidable relative to the clamping member 44 along a direction of a broken-line arrow Q1, that is, an axis-Xr direction (an up-down direction in FIG. 2A).

The clamping member 44 is provided outside the rotating tool portion 41 and has a generally cylindrical shape having a hollow. The rotating tool portion 41 is inserted into the hollow. The clamping member 44 is supported by the support member (not shown) via the spring 43, so as to press a workpiece (a second member 2) from one surface (a top face in FIG. 2A) thereof. Accordingly, the clamping member 44 is configured to be movable in a direction of a broken-line arrow Q3, that is, the axis-Xr direction in a state where the clamping member 44 is biased toward the workpiece.

The rotating tool portion 41 and the clamping member 44 configured as such include abutting surfaces 41a, 44a, respectively. The abutting surfaces 41a, 44a are moved by the drive mechanism (not shown) in the axis-Xr direction so as to abut with the one surface of the workpiece.

Note that a specific configuration of the single acting friction stir welding (FSW) apparatus 40 in the present embodiment is not limited to the above configuration, and may include other members, which are not described in terms of the FSW apparatus 40.

<Joining Method Using Friction Stir Welding Joining Apparatus>

Next will be generally described the joining method using the FSW apparatus 40 according to Embodiment 2, with reference to FIG. 2. Embodiment 2 specifically describes a method for joining a first member 1 and a second member 2, which are similar to those in Embodiment 1.

Similarly to the joining method according to Embodiment 1, the joining method according to Embodiment 2 mainly includes a laminating step, a softening-melting/introducing step, and a curing step.

First, in the laminating step, the second member 2 is laminated on the first member 1 so as to cover an opening 3a of a hole 3 provided in the first member 1, as illustrated in FIG. 2A. Subsequently, the FSW apparatus 40 is positioned and disposed on a top face 2a of the second member 2, so that the opening 3a of the hole 3 of the first member 1 is placed on the axis Xr, in other words, the rotating tool portion (a pin member) 41 is placed above the opening 3a of the hole 3 of the first member 1 and one surface (the top face in FIG. 2) 2a of the second member 2 abuts with the abutting surfaces 41a, 44a of the rotating tool portion 41 and the clamping member 44. Note that the first member 1 is supported by a support member (not shown), and the second member 2 is supported in such a manner that the second member 2 is pressed against the first member 1 by the clamping member 44.

Figure 2B:
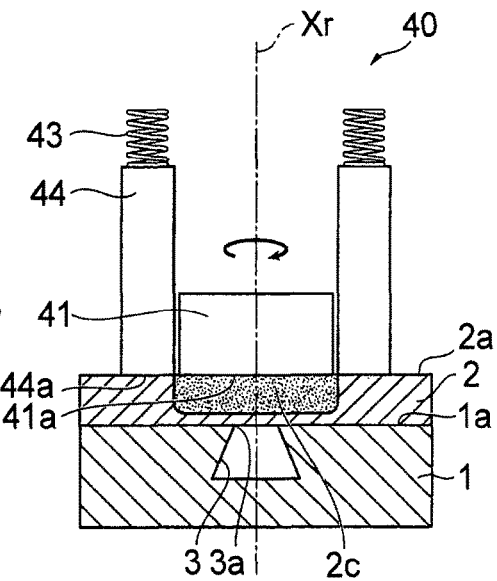
FIG. 2B is a drawing of a longitudinal section to describe Embodiment 2 of the joining method of the present invention, and describes a softening-melting/introducing step thereof.
Figure 2C:
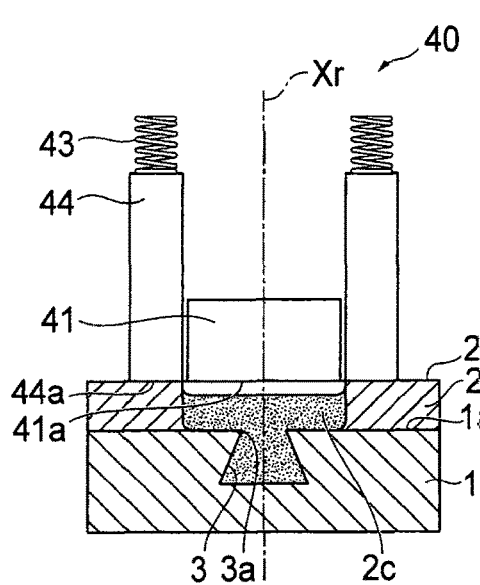
FIG. 2C is a drawing of a longitudinal section to describe Embodiment 2 of the joining method of the present invention, and describes the softening-melting/introducing step thereof.

Then, in the softening-melting/introducing step, the rotating tool portion 41 is rotated around the axis Xr, so that a constituent material of the second member 2, particularly a constituent material of that part of the second member 2 which is placed on the hole 3 of the first member 1 is softened or melted by use of frictional heat generated between the abutting surface 41a of the rotating tool portion 41 and the top face 2a of the second member 2, as illustrated in FIG. 2B. The softened or melted constituent material 2c of the second member 2 is introduced into the hole 3 through the opening 3a by gravity (by its own weight), as illustrated in FIG. 2C. Note that, in the softening-melting/introducing step, the softened or melted constituent material 2c of the second member 2 may be introduced into the hole 3 in such a manner that the rotating tool portion 41 is moved downward along the axis-Xr direction so that the constituent material 2c of that part of the second member 2 which is below the rotating tool portion 41 is partially pushed into the hole 3 of the first member 1.

Figure 2D:
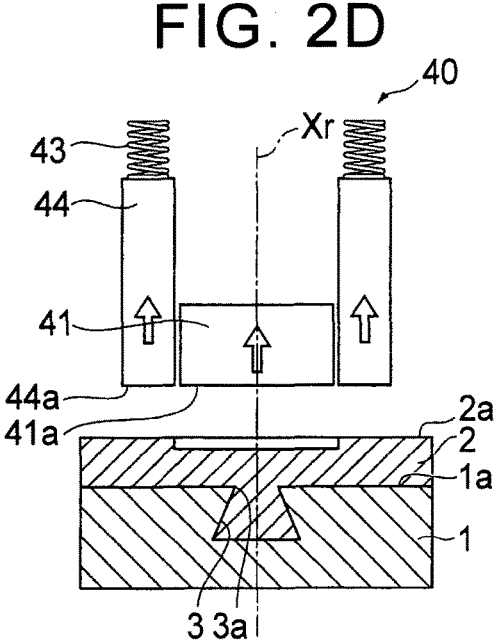
FIG. 2D is a drawing of a longitudinal section to describe Embodiment 2 of the joining method of the present invention, and describes a curing step thereof.

Further, in the curing step, as illustrated in FIG. 2D, the softened or melted constituent material 2c of the second member 2 (that constituent material of the second member 2 which is introduced into the hole 3 of the first member 1 and that constituent material of the second member 2 which remains on a top face 1a of the first member 1 around the hole 3) is cured so that the first member 1 is integrated with the second member 2, and then, the FSW apparatus 40 is removed from the top face 2a of the second member 2.

Thus, the joining method of Embodiment 2 is performed such that: the second member 2 is laminated on the first member 1 so as to cover the opening 3a of the hole 3 provided in the first member 1; the constituent material of that part of the second member 2 which is placed on the opening 3a of the hole 3 is locally softened or melted by use of frictional heat; the softened or melted constituent material 2c of the second member 2 is introduced into the hole 3 through the opening 3a of the hole 3 of the first member 1; and the constituent material 2c of the second member 2 thus introduced into the hole 3 is cured. This makes it possible to easily join the first member 1 and the second member 2, which are different type of members, at low cost.

Further, in the joining method of Embodiment 2, the constituent material of that part of the second member 2 which is placed on the opening 3a of the hole 3 is softened or melted by use of frictional heat, thereby yielding such an advantage that the constituent material of the second member 2 can be more surely softened and melted.

[Embodiment 3]

FIG. 3 is a drawing of a longitudinal section to describe Embodiment 3 of the joining method of the present invention: FIG. 3A is a view to describe a laminating step thereof; FIG. 3B is a view to describe a softening-melting step thereof; FIG. 3C is a view to describe an introducing step thereof and FIG. 3D is a view to describe a curing step thereof <Friction Stir Welding Apparatus Used in Embodiment 3 of Joining Method of Present Invention>

The joining method according to Embodiment 3 of the present invention is performed by use of a double acting friction stir welding apparatus as a typical example of a friction stir welding apparatus. On that account, initially, the following generally describes a typical example of the double acting friction stir welding (FSW) apparatus used in the joining method according to Embodiment 3, with reference to FIG. 3A.

Figure 3A:
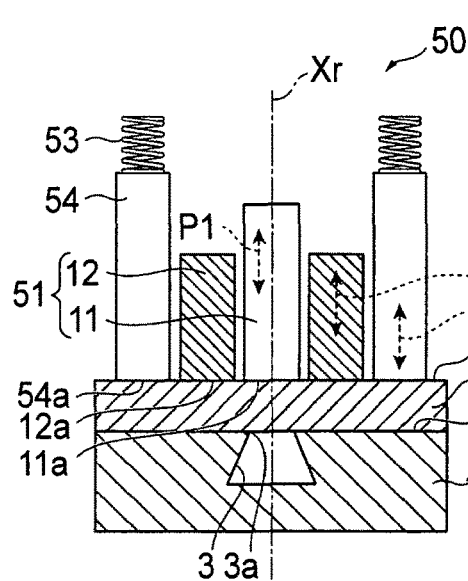
FIG. 3A is a drawing of a longitudinal section to describe Embodiment 3 of the joining method of the present invention, and describes a laminating step thereof.

As illustrated in FIG. 3A, the FSW apparatus 50 used in the joining method according to Embodiment 3 mainly includes a rotating tool portion 51 and a clamping member 54, and also includes support members that support these members, a drive mechanism that drives the rotating tool portion 51, and so on, although not illustrated in FIG. 3A. The clamping member 54 is fixed to the support member (not shown) via a spring 53.

The rotating tool portion 51 is constituted by a pin member 11 and a shoulder member 12. The pin member 11 has a generally circular column shape. The pin member 11 is configured to be rotated by the drive mechanism (not shown) around an axis (a rotating axis) Xr and to be movable relative to the shoulder member 12 along a direction of a broken-line arrow P1, that is, an axis-Xr direction (an up-down direction in FIG. 3A). The shoulder member 12 has a generally cylindrical shape having a hollow. The pin member 11 is inserted into the hollow, and the shoulder member 12 is supported by a support member (not shown) outside the pin member 11 so as to surround the pin member 11. The shoulder member 12 is configured to be rotated by the drive mechanism (not shown) around the axis Xr, which is the same as the pin member 11, and to be movable relative to the pin member 11 (in the same direction as the pin member 11 or an opposite direction to the pin member 11) along a direction of a broken-line arrow P2 direction, that is, along the axis-Xr direction. Accordingly, the pin member 11 and the shoulder member 12 constituting the rotating tool portion 51 are configured to be rotated integrally around the axis Xr and to be movable relative to each other (in the same direction or in opposite directions) along the axis-Xr direction.

The clamping member 54 is provided outside the shoulder member 12 of the rotating tool portion 51 and has a generally cylindrical shape having a hollow, similarly to the shoulder member 12. The shoulder member 12 is inserted into the hollow. Accordingly, the shoulder member 12 having a generally cylindrical shape is placed on an outer periphery of the pin member 11, and the clamping member 54 having a generally cylindrical shape is placed on an outer periphery of the shoulder member 12. In other words, the clamping member 54, the shoulder member 12, and the pin member 11 have a nested structure in which they are placed coaxially. The clamping member 54 is supported by the support member (not shown) via the spring 53, so as to press a workpiece (a second member 2) from one surface (a top face in FIG. 3A) thereof. Accordingly, the clamping member 54 is configured to be movable in a direction of a broken-line arrow P3, that is, the axis-Xr direction in a state where the clamping member 54 is biased toward the workpiece.

The pin member 11 and the shoulder member 12 constituting the rotating tool portion 51, and the clamping member 54 include an abutting surface 11a, an abutting surface 12a, and an abutting surface 54a, respectively. The abutting surfaces 11a, 12a, and 54a are moved by the drive mechanisms (not shown) in the axis-Xr direction so as to abut with the one surface of the workpiece.

Note that the concrete configuration of the rotating tool portion 51 in the present embodiment is not limited to the configuration described above, and a well-known configuration in the field of FSW can be used appropriately. Further, the friction stir welding apparatus is not limited to the FSW apparatus 50 having the above configuration, and may have a configuration in which the clamping member 54 is provided outside the pin member 11, or may include other members, which are not described in terms of the FSW apparatus 50.

<Joining Method Using Friction Stir Welding Apparatus>

Next will be generally described the joining method using the FSW apparatus 50 according to Embodiment 3, with reference to FIG. 3. Embodiment 3 specifically describes a method for joining a first member 1 and a second member 2, which are similar to those in Embodiments 1, 2.

The joining method according to Embodiment 3 mainly includes a laminating step, a softening-melting step, an introducing step, and a curing step.

First, in the laminating step, the second member 2 is laminated on the first member 1 so as to cover an opening 3a of a hole 3 provided in the first member 1, as illustrated in FIG. 3A. Subsequently, the FSW apparatus 50 is positioned and disposed on a top face 2a of the second member 2, so that the opening 3a of the hole 3 of the first member 1 is placed on the axis Xr, in other words, the pin member 11 of the rotating tool portion 51 is placed above the opening 3a of the hole 3 of the first member 1 and one surface (the top face in FIG. 3) 2a of the second member 2 abuts with the abutting surfaces 11a, 12a, 54a of the pin member 11, the shoulder member 12, and the clamping member 54. Note that the first member 1 is supported by a support member (not shown), and the second member 2 is supported in such a manner that the second member 2 is pressed against the first member 1 by the clamping member 54.

Figure 3B:
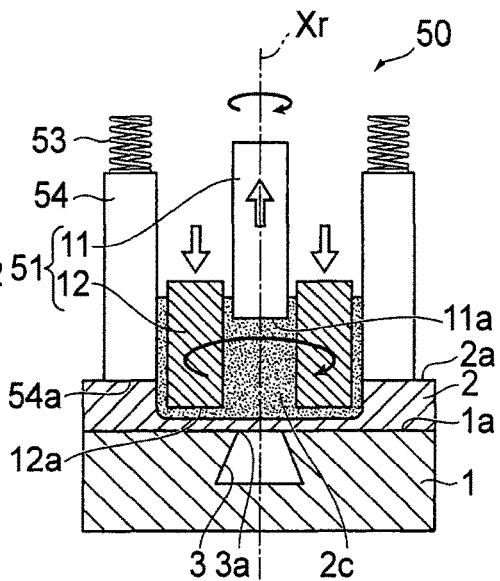
FIG. 3B is a drawing of a longitudinal section to describe Embodiment 3 of the joining method of the present invention, and describes a softening-melting step thereof.

Then, in the softening-melting step, the pin member 11 and the shoulder member 12 are rotated integrally around the axis Xr, so that a constituent material of the second member 2, particularly a constituent material of that part of the second member 2 which is placed on the hole 3 of the first member 1 is softened or melted by use of frictional heat generated between the abutting surfaces 11a, 12a of the pin member 11 and the shoulder member 12 and the top face 2a of the second member 2, as illustrated in FIG. 3B. At this time, the shoulder member 12 is moved downward by a predetermined amount along the axis-Xr direction and the pin member 11 is moved upward along the axis-Xr direction, so that a softened or melted constituent material 2c of the second member 2 is led below the pin member 11.

Figure 3C:
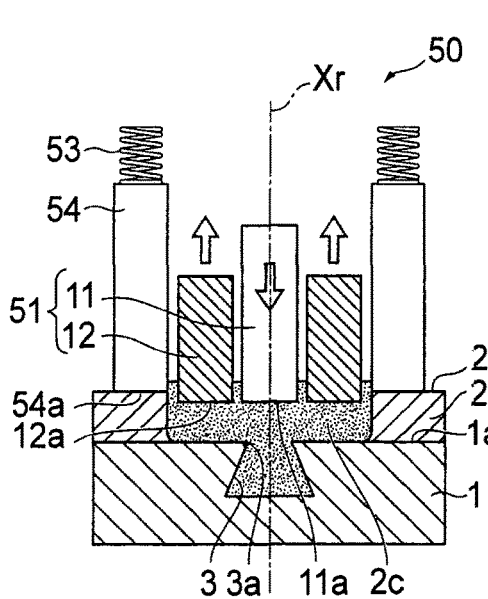
FIG. 3C is a drawing of a longitudinal section to describe Embodiment 3 of the joining method of the present invention, and describes an introducing step thereof.

Then, in the introducing step, as illustrated in FIG. 3C, rotations of the pin member 11 and the shoulder member 12 are stopped, and the pin member 11 is moved downward along the axis-Xr direction, so that that constituent material 2c of the second member 2 which is led below the pin member 11 is partially pushed into the hole 3 of the first member 1. At this time, the shoulder member 12 is moved upward by a predetermined amount along the axis-Xr direction according to a volume of the softened or melted constituent material 2c of the second member 2, a volume of the hole 3 of the first member 1, and so on, for example, so that the abutting surface 11a of the pin member 11 and the abutting surface 12a of the shoulder member 12 are placed at generally the same height.

Figure 3D:
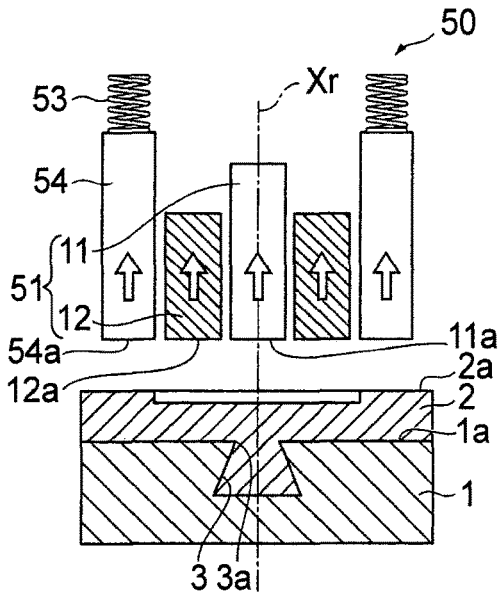
FIG. 3D is a drawing of a longitudinal section to describe Embodiment 3 of the joining method of the present invention, and describes a curing step thereof.
Figure 4A:
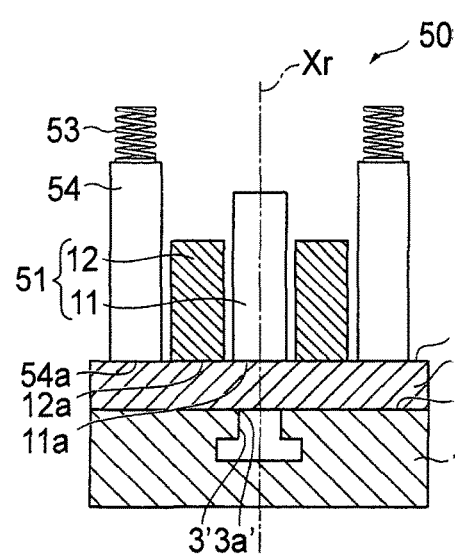
FIG. 4A is a drawing of a longitudinal section to describe Modification of the joining method illustrated in FIG. 3, and describes a laminating step thereof.
Figure 4B:
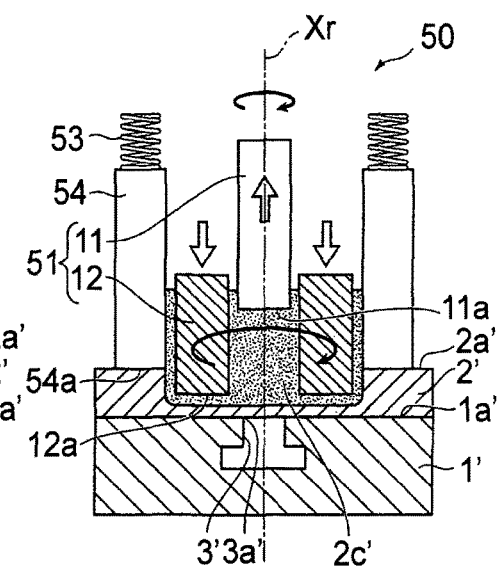
FIG. 4B is a drawing of a longitudinal section to describe Modification of the joining method illustrated in FIG. 3, and describes a softening-melting step thereof.
Figure 4C:
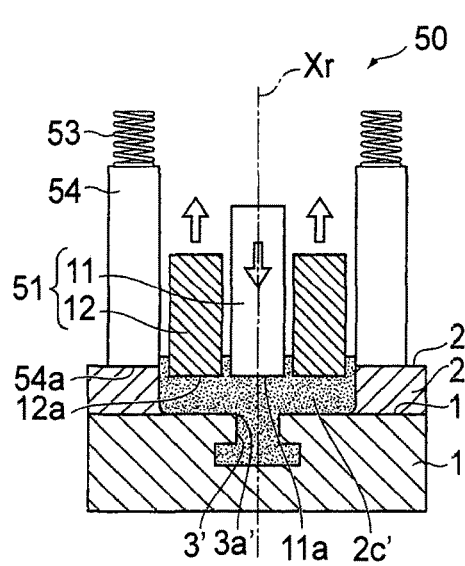
FIG. 4C is a drawing of a longitudinal section to describe Modification of the joining method illustrated in FIG. 3, and describes an introducing step thereof.
Figure 4D:
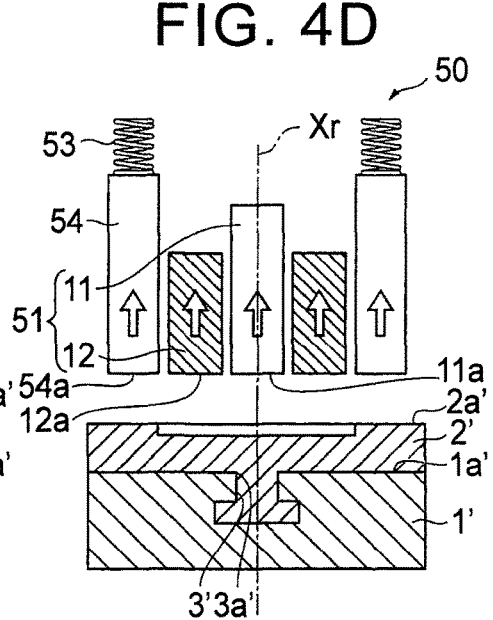
FIG. 4D is a drawing of a longitudinal section to describe Modification of the joining method illustrated in FIG. 3, and describes a curing step thereof.

Further, in the curing step, as illustrated in FIG. 3D, the softened or melted constituent material 2c of the second member 2 in the softening-melting step (that constituent material of the second member 2 which is introduced into the hole 3 of the first member 1 and that constituent material of the second member 2 which remains on the top face 1a of the first member 1 around the hole 3) is cured so that the first member 1 is integrated with the second member 2, and then, the FSW apparatus 50 is removed from the top face 2a of the second member 2.

Thus, the joining method of Embodiment 3 is performed such that: the second member 2 is laminated on the first member 1 so as to cover the opening 3a of the hole 3 provided in the first member 1; the constituent material of that part of the second member 2 which is placed on the opening 3a of the hole 3 is locally softened or melted by use of frictional heat; the softened or melted constituent material 2c of the second member 2 is introduced into the hole 3 of the first member 1 through the opening 3a of the hole 3; and the constituent material 2c of the second member 2 thus introduced into the hole 3 is cured. This makes it possible to easily join the first member 1 and the second member 2, which are different type of members, at low cost.

Note that a shape (a longitudinal sectional shape and a cross sectional shape) of the hole provided in the first member can be designed appropriately according to joining strength between the first member and the second member, and so on.

For example, in the above embodiment, in order to obtain an anchor effect, the hole 3 provided in the first member 1 is continuously reduced in diameter toward the opening 3a on the one surface (the top face), so that a sectional area of the hole 3 along a direction perpendicular to a laminating direction (the axis-Xr direction) is minimized at the opening 3a. However, the following fact has been confirmed by the inventor(s): in such a case, a portion cured in the hole 3 of the first member 1 is broken from the second member 2 due to a taper angle or the like of the hole 3, so that the second member 2 may be detached from the first member 1 or a portion cured in the hole 3 of the first member 1 may be slipped off from the hole 3 due to elasticity or the like of the second member 2. In view of this, for example, as illustrated in FIGS. 4A to 4D, a hole 3' provided in a first member 1' may be formed so as to be reduced in diameter in a stepped manner toward an opening 3a' on one surface (a top face).

Figure 5:
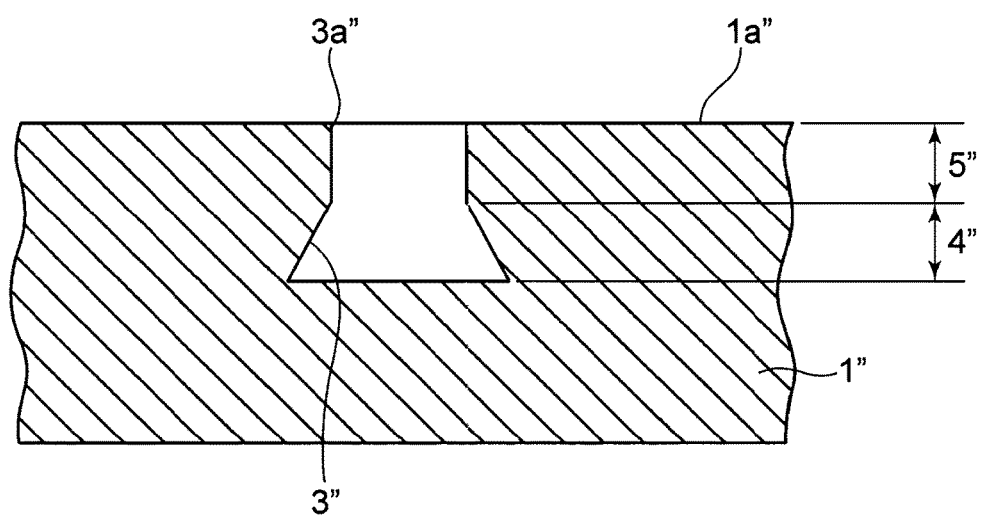
FIG. 5 is a drawing of a longitudinal section illustrating another example of a hole of a first member illustrated in FIG. 3.

Further, the hole provided in the first member may be formed by appropriately combining a reduced diameter portion reduced in diameter continuously or in a stepped manner toward the opening on the one surface (the top face), a linear portion having the same inside diameter in a thickness direction (a laminating direction) of the first member, and an enlarged diameter portion enlarged in diameter continuously or in a stepped manner toward the opening on the one surface (the top face). For example, as illustrated in FIG. 5, a reduced diameter portion 4" reduced in diameter continuously or in a stepped manner toward an opening 3a" on one surface (a top face) 1a" may be provided on a lower end side of a hole 3" provided in a first member 1" (a reduced diameter portion reduced in diameter continuously in FIG. 5), and a linear portion 5" having the same inside diameter along a thickness direction of the first member 1" may be provided on its upper end side.

Figure 6A:
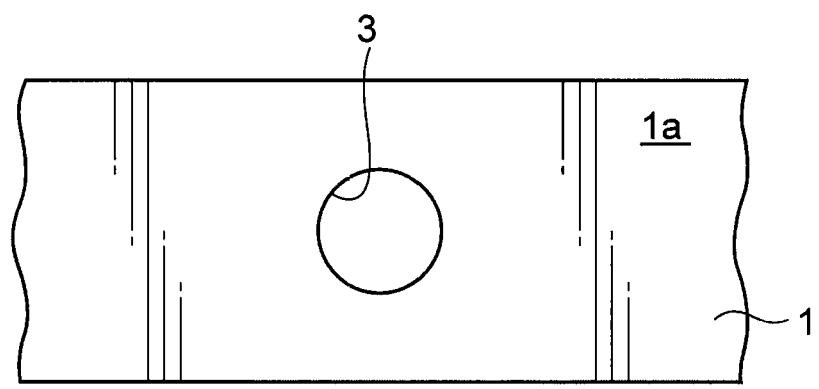
FIG. 6A is a plan view illustrating one example of the hole of the first member illustrated in FIG. 3.
Figure 6B:
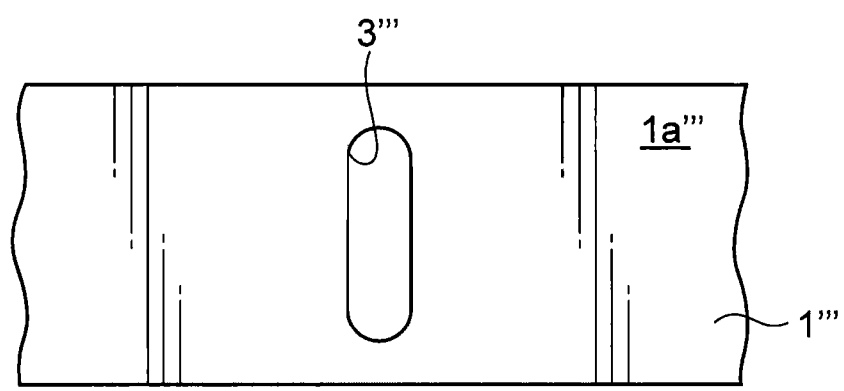
FIG. 6B is a plan view illustrating another example of the hole of the first member illustrated in FIG. 3.
Figure 8A:
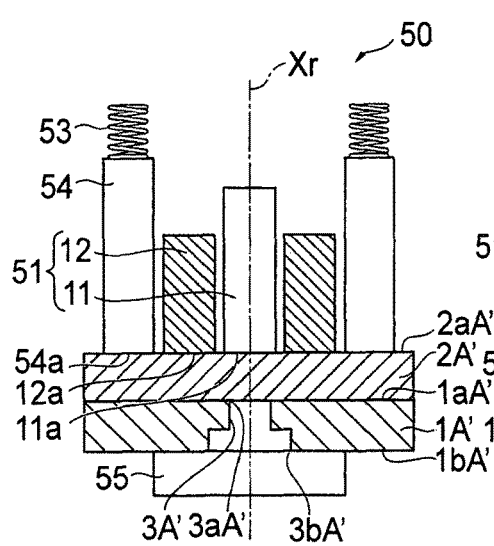
FIG. 8A is a drawing of a longitudinal section to describe Modification of the joining method illustrated in FIG. 7, and describes a laminating step thereof.
Figure 8B:
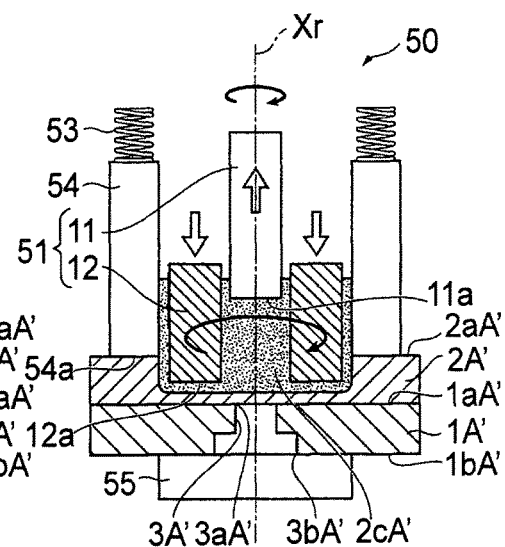
FIG. 8B is a drawing of a longitudinal section to describe Modification of the joining method illustrated in FIG. 7, and describes a softening-melting step thereof.
Figure 8C:
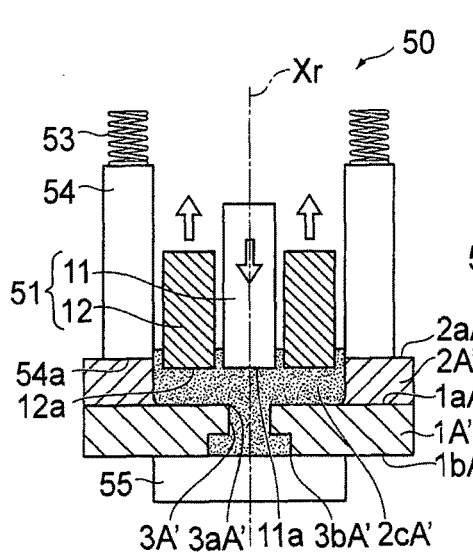
FIG. 8C is a drawing of a longitudinal section to describe Modification of the joining method illustrated in FIG. 7, and describes an introducing step thereof.
Figure 8D:
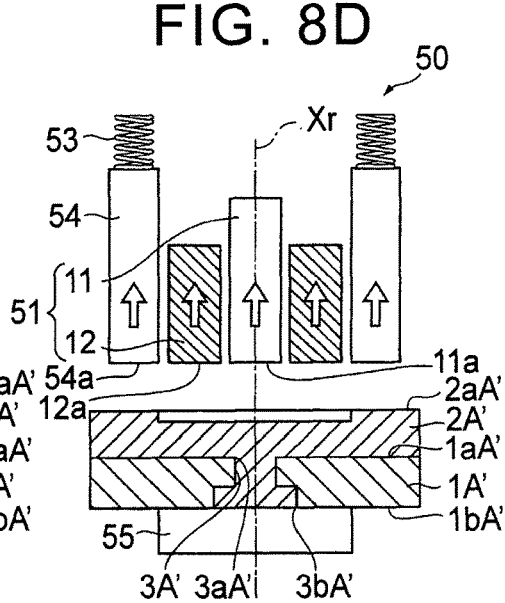
FIG. 8D is a drawing of a longitudinal section to describe Modification of the joining method illustrated in FIG. 7, and describes a curing step thereof.

Further, needless to say, a shape, in a plan view, of the opening of the hole provided in the first member may be a generally circular shape (see FIG. 6A), a generally elliptical shape, a generally elongated hole shape (see FIG. 6B), a polygonal shape such as a square shape, or the like.

[Embodiment 4]

FIG. 7 is a drawing of a longitudinal section to describe Embodiment 4 of the joining method of the present invention: FIG. 7A is a view to describe a laminating step thereof; FIG. 7B is a view to describe a softening-melting step thereof; FIG. 7C is a view to describe an introducing step thereof; and FIG. 7D is a view to describe a curing step thereof. Note that the joining method according to Embodiment 4 is performed by use of the FSW apparatus 50 used in the joining method according to Embodiment 3 described above. Embodiment 4 specifically describes a method in which a generally flat-shaped first member 1A made of a metal member, a resin member, a wood material, or the like having a hole (through hole) 3A formed from one surface (a top face in FIG. 7) 1aA toward the other surface (a bottom face in FIG. 7) 1bA is joined to a generally flat-shaped second member 2A made of a metal member, a resin member, or the like including a material of which a melting temperature is lower than that of a constituent material of the first member 1A.

Similarly to the joining method according to Embodiment 3 described above, the joining method according to Embodiment 4 mainly includes a laminating step, a softening-melting step, an introducing step, and a curing step.

First, in the laminating step, the second member 2A is laminated on the first member 1A so as to cover an opening 3aA on a top face 1aA of the hole 3A provided in the first member 1A, as illustrated in FIG. 7A. Subsequently, the FSW apparatus 50 is positioned and disposed on a top face 2aA of the second member 2, so that the opening 3aA of the hole 3A of the first member 1A is placed on an axis Xr, in other words, the pin member 11 of the rotating tool portion 51 is placed above the opening 3aA of the hole 3A of the first member 1A and one surface (the top face in FIG. 7) 2aA of the second member 2A abuts with the abutting surfaces 11a, 12a, 54a of the pin member 11, the shoulder member 12, and the clamping member 54. Further, a generally flat-shaped backing member (also referred to as a back tool) 55 is positioned and disposed so as to cover an opening 3bA on a bottom face 1bA of the hole 3A of the first member 1A. Note that the backing member 55 is supported by a support member (not shown), and the second member 2A and the first member 1A are supported in such a manner that the second member 2A and the first member 1A are pressed against the backing member 55 by the clamping member 54.

Subsequently, the softening-melting step (see FIG. 7B), the introducing step (see FIG. 7C), and the curing step (see FIG. 7D) similar to those steps in the joining method according to Embodiment 3 are performed, so that the first member 1A and the second member 2A are joined to each other so as to be integrated with each other.

Thus, the joining method of Embodiment 4 is performed such that: the second member 2A is laminated on the first member 1A so as to cover the opening 3aA on the one surface 1aA of the hole 3A provided in the first member 1A; the constituent material of that part of the second member 2A which is placed on the opening 3aA of the hole 3A is locally softened or melted by use of frictional heat; a softened or melted constituent material 2cA of the second member 2A is introduced into the hole 3A through the opening 3aA of the hole 3A of the first member 1A; and the constituent material 2cA of the second member 2A thus introduced into the hole 3A is cured. This makes it possible to easily join the first member 1A and the second member 2A, which are different type of members, at low cost.

Further, in the joining method of Embodiment 4, the hole 3A of the first member 1A is formed so as to penetrate from the one surface 1aA to the other surface 1bA. Accordingly, in the introducing step, the softened or melted constituent material 2cA of the second member 2A can be introduced into the hole 3A of the first member 1A while gas such as air and the like existing in the hole 3A of the first member 1A is being exhausted through the opening 3bA on the other surface 1bA of the hole 3A. This makes it possible to more tightly and strongly join the first member 1A to the second member 2A, thereby yielding such an advantage that joining strength between the first member 1A and the second member 2A can be increased more effectively.

Note that, similarly to the joining method of Embodiment 3, a shape (a longitudinal sectional shape and a cross sectional shape) of the hole provided in the first member can be designed appropriately according to the joining strength between the first member and the second member, and so on in the joining method of Embodiment 4.

That is, for example, as illustrated in FIGS. 8A to 8D, a hole 3A' provided in a first member 1A' may be formed so as to be reduced in diameter in a stepped manner from an opening 3bA' on the other surface (bottom face) 1bA' toward an opening 3aA' on one surface (top face) 1aA'.

Figure 9:
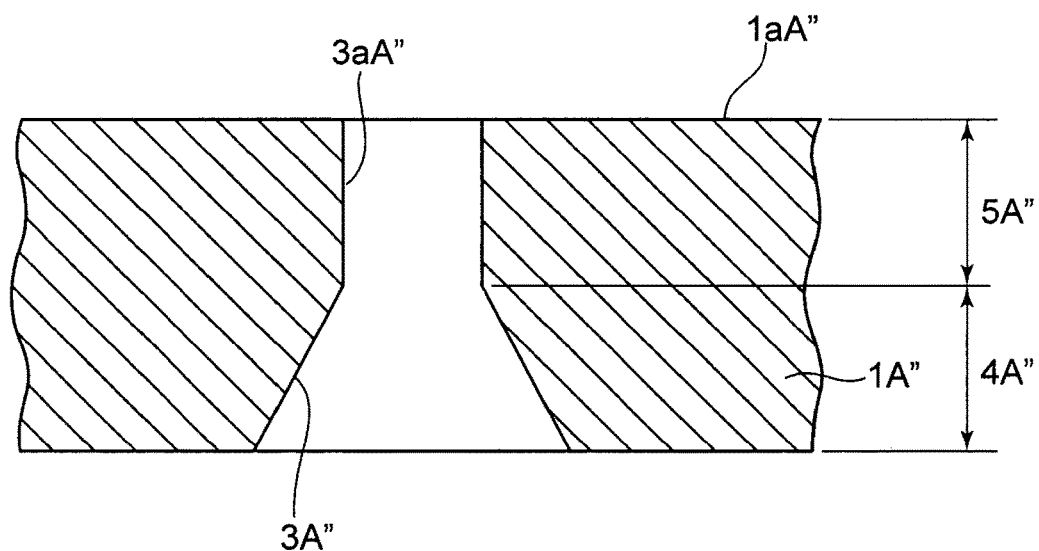
FIG. 9 is a drawing of a longitudinal section illustrating another example of a hole of a first member illustrated in FIG. 7.

Further, the hole provided in the first member may be formed by appropriately combining a reduced diameter portion reduced in diameter continuously or in a stepped manner toward the opening on the one surface (the top face), a linear portion having the same inside diameter in the thickness direction (a laminating direction) of the first member, an enlarged diameter portion enlarged in diameter continuously or in a stepped manner toward the opening on the one surface (the top face). For example, as illustrated in FIG. 9, a reduced diameter portion 4A" (a reduced diameter portion reduced in diameter continuously in FIG. 9) reduced in diameter continuously or in a stepped manner toward an opening 3aA" on one surface (a top face) 1aA" may be provided on a bottom face of a hole 3A" provided in a first member 1A", and a linear portion 5A" having the same inside diameter along a thickness direction of the first member 1K may be provided on its upper side.

Figure 10:
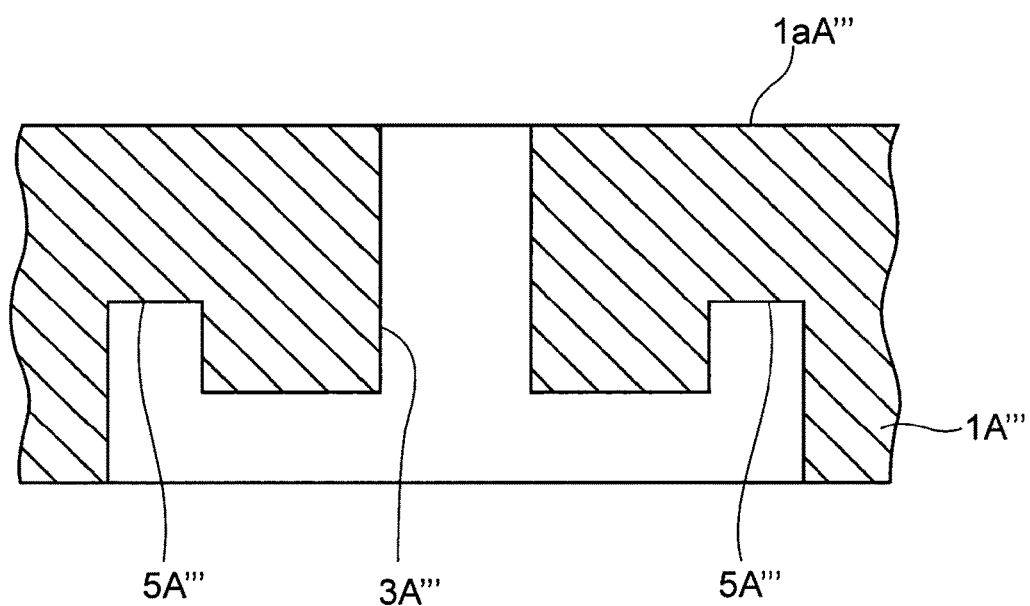
FIG. 10 is a drawing of a longitudinal section illustrating another example of a hole of a first member illustrated in FIG. 8.

Further, for example, as illustrated in FIG. 10, an annular groove 5A''' hollowed toward one surface (a top face) 1aA''' may be formed in part of that hole 3A''' of a first member 1A''' which is reduced in diameter in a stepped manner (in an outer peripheral portion of the hole 3A''' in FIG. 10), and a softened or melted constituent material of a second member may be also introduced into the groove 5A''' in the above described introducing step, and then cured. In this case, it is possible to increase a contact area between the first member 1A''' and that constituent material of the second member which is introduced into the hole 3A''', and to increase an anchor effect, thereby making it possible to further increase the joining strength between the first member and the second member.

Further, needless to say, a shape, in a plan view, of the opening of the hole provided in the first member may be a generally circular shape, a generally elliptical shape, a generally elongated hole shape, a polygonal shape such as a square shape, or the like.

[Embodiment 5]

FIG. 11 is a drawing of a longitudinal section to describe Embodiment 5 of the joining method of the present invention: FIG. 11A is a view to describe a laminating step thereof; FIG. 11B is a view to describe a softening-melting step thereof; FIG. 11C is a view to describe an introducing step thereof; and FIG. 11D is a view to describe a curing step thereof. Note that the joining method according to Embodiment 5 is performed by use of the FSW apparatus 50 used in the joining method according to Embodiments 3, 4 described above. Embodiment 5 specifically describes a method in which a generally flat-shaped first member 1B made of a metal member, a resin member, a wood material, or the like having a linear hole (through hole) 3B formed from one surface (a top face in FIG. 11) 1aB toward the other surface (a bottom face in FIG. 11) 1bB is joined to a generally flat-shaped second member 2B made of a metal member, a resin member, or the like including a material of which a melting temperature is lower than that of a constituent material of the first member 1B.

Similarly to the joining methods according to Embodiments 3, 4, the joining method according to Embodiment 5 mainly includes a laminating step, a softening-melting step, an introducing step, and a curing step.

Figure 11A:
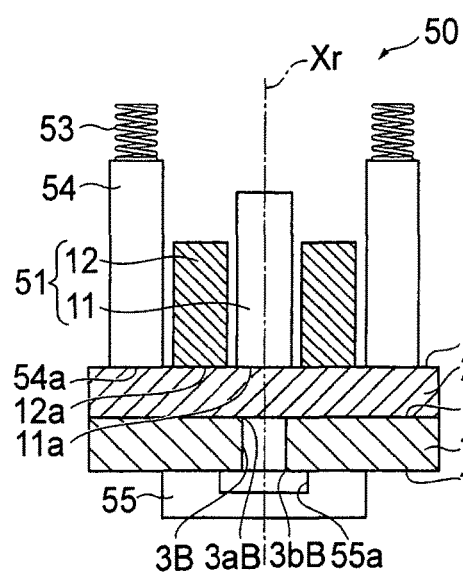
FIG. 11A is a drawing of a longitudinal section to describe Embodiment 5 of the joining method of the present invention, and describes a laminating step thereof.
Figure 11B:
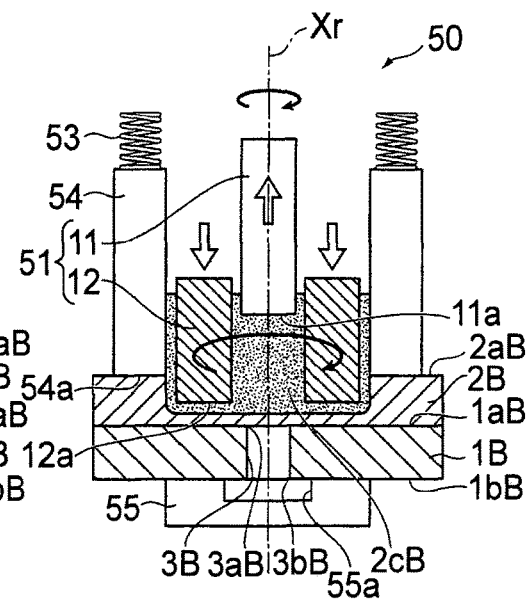
FIG. 11B is a drawing of a longitudinal section to describe Embodiment 5 of the joining method of the present invention, and describes a softening-melting step thereof.

First, in the laminating step, the second member 2B is laminated on the first member 1B so as to cover an opening 3aB of the hole 3B provided in the first member 1B which opening 3aB is formed on the top face 1aB, as illustrated in FIG. 11A. Subsequently, the FSW apparatus 50 is positioned and disposed on a top face 2aB of the second member 2B, so that the opening 3aB of the hole 3B of the first member 1B is placed on an axis Xr, in other words, the pin member 11 of the rotating tool portion 51 is placed above the opening 3aB of the hole 3B of the first member 1B and one surface (the top face in FIG. 11) 2aB of the second member 2B abuts with the abutting surfaces 11a, 12a, 54a of the pin member 11, the shoulder member 12, and the clamping member 54.

Further, a backing member (also referred to as a back tool) 55 having a recessed depression 55a having an inside diameter or a cross sectional area larger than a diameter or a cross sectional area (a sectional area of the hole 3B along a direction perpendicular to a laminating direction) of the hole 3B of the first member 1B is prepared in advance. Then, the backing member 55 is positioned and disposed so that the backing member 55 covers an opening 3bB of the hole 3B of the first member 1B which opening 3bB is formed on the bottom face 1bB, and the depression 55a of the backing member 55 communicates with the hole 3B of the first member 1B. Note that the backing member 55 is supported by a support member (not shown), and the second member 2B and the first member 1B are supported in such a manner that the second member 2B and the first member 1B are pressed against the backing member 55 by the clamping member 54.

Figure 11C:
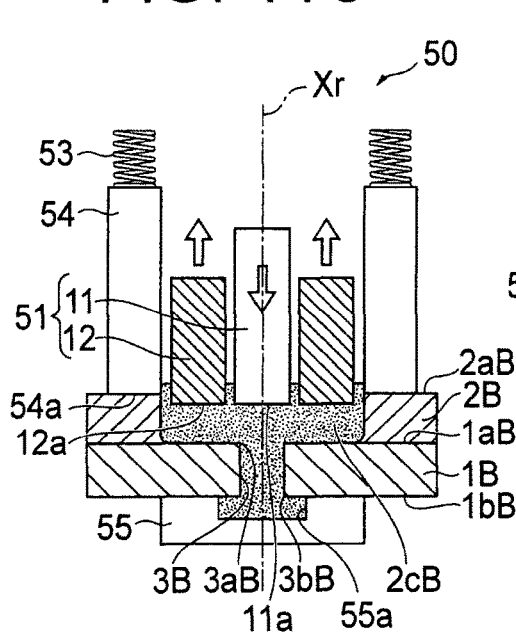
FIG. 11C is a drawing of a longitudinal section to describe Embodiment 5 of the joining method of the present invention, and describes an introducing step thereof.

Subsequently, the softening-melting step (see FIG. 11B) similar to the softening-melting step in the joining methods according to Embodiments 3, 4 is performed. In the introducing step, as illustrated in FIG. 11C, the pin member 11 is moved downward along the axis-Xr direction, so that that constituent material 2cB of the second member 2B which is led below the pin member 11 is partially pushed into the hole 3B of the first member 1B and the depression 55a of the backing member 55. At this time, the shoulder member 12 is moved upward by a predetermined amount along the axis-Xr direction according to a volume of a softened or melted constituent material 2cB of the second member 2B, volumes of the hole 3B of the first member 1B and the depression 55a of the backing member 55, and so on, for example, so that the abutting surface 11a of the pin member 11 and the abutting surface 12a of the shoulder member 12 are placed at generally the same height.

Figure 11D:
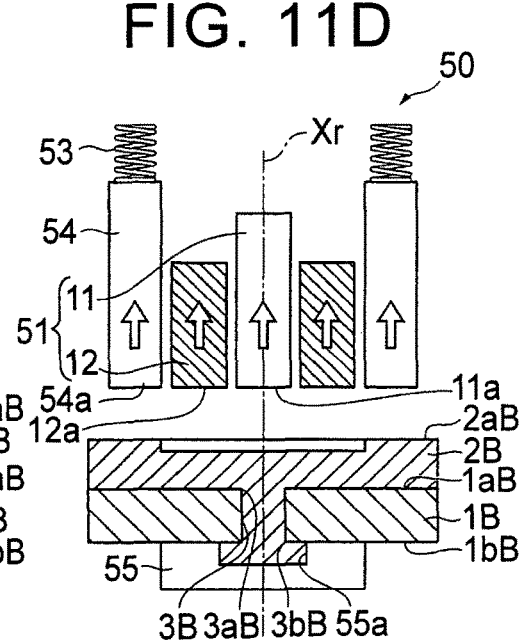
FIG. 11D is a drawing of a longitudinal section to describe Embodiment 5 of the joining method of the present invention, and describes a curing step thereof.
Figure 12A:
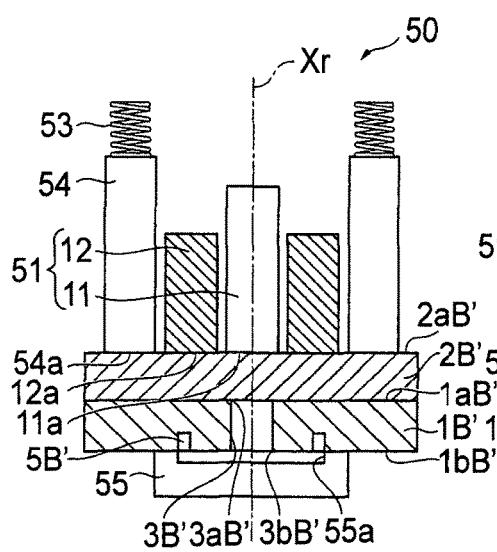
FIG. 12A is a drawing of a longitudinal section to describe Modification of the joining method illustrated in FIG. 11, and describes a laminating step thereof.
Figure 12B:
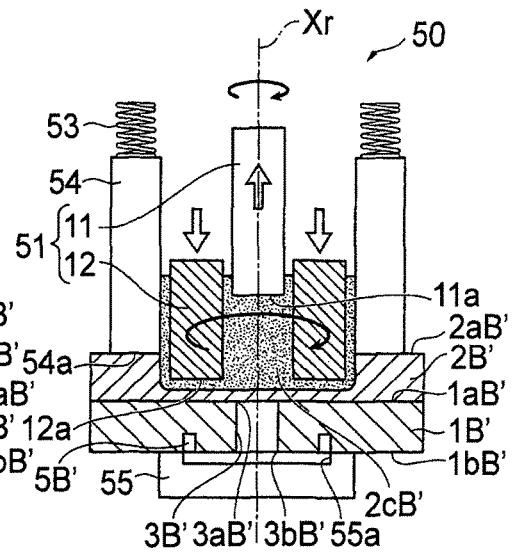
FIG. 12B is a drawing of a longitudinal section to describe Modification of the joining method illustrated in FIG. 11, and describes a softening-melting step thereof.
Figure 12C:
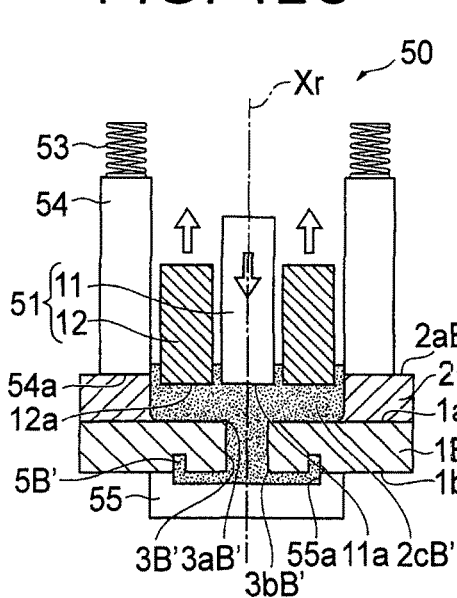
FIG. 12C is a drawing of a longitudinal section to describe Modification of the joining method illustrated in FIG. 11, and describes an introducing step thereof.
Figure 12D:
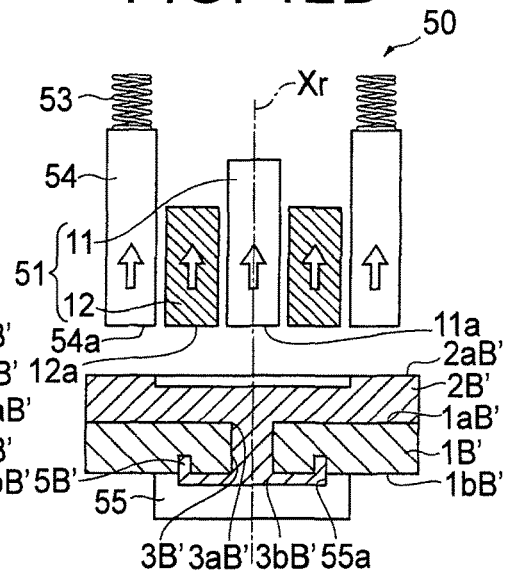
FIG. 12D is a drawing of a longitudinal section to describe Modification of the joining method illustrated in FIG. 11, and describes a curing step thereof.
Figure 14A:
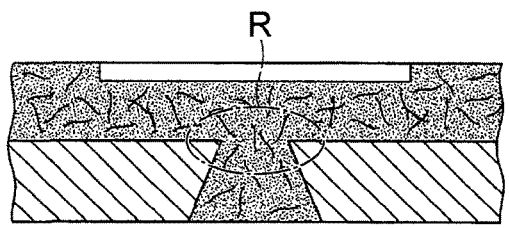
FIG. 14A is a drawing of a longitudinal section illustrating a joining state between a first member and a second member in a case where the second member is made of a fiber reinforced resin material.
Figure 14B:
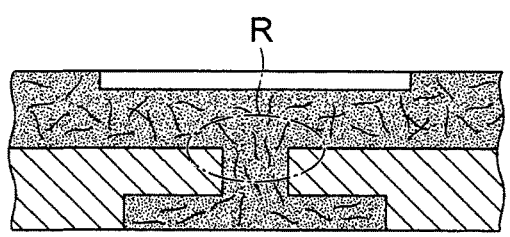
FIG. 14B is a drawing of a longitudinal section illustrating a joining state between a first member and a second member in a case where the second member is made of a fiber reinforced resin material.
Figure 14C:
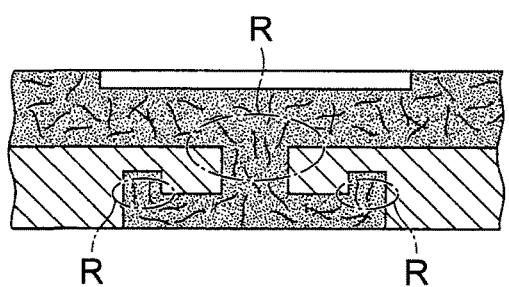
FIG. 14C is a drawing of a longitudinal section illustrating a joining state between a first member and a second member in a case where the second member is made of a fiber reinforced resin material.
Figure 14D:
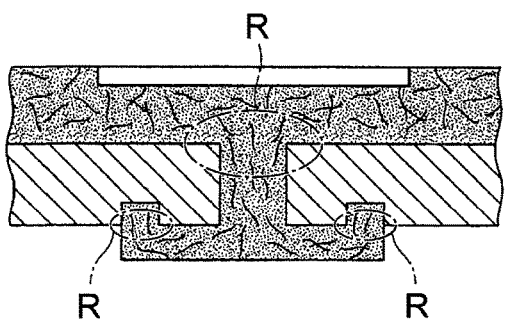
FIG. 14D is a drawing of a longitudinal section illustrating a joining state between a first member and a second member in a case where the second member is made of a fiber reinforced resin material.

Further, in the curing step, as illustrated in FIG. 11D, the softened or melted constituent material 2cB of the second member 2B in the softening-melting step (that constituent material of the second member 2B which is introduced into the hole 3B of the first member 1B and the depression 55a of the backing member 55 and that constituent material of the second member 2B which remains on the top face 1aB of the first member 1B around the hole 3B) is cured so that the first member 1B is integrated with the second member 2B. Then, the FSW apparatus 50 is removed from the top face 2aB of the second member 2B and the backing member 55 is removed from the bottom face 1bB of the first member 1B.

Thus, the joining method of Embodiment 5 is performed in such a manner that: the second member 2B is laminated on the first member 1B so as to cover the opening 3aB, on the one surface 1aB, of the linear hole (through hole) 3B provided in the first member 1B; the backing member 55 is disposed on the other surface 1bB of the first member 1B so that the backing member 55 covers the opening 3bB, on the bottom face 1bB, of the hole 3B of the first member 1B and the depression 55a of the backing member 55 communicates with the hole 3B of the first member 1B; the constituent material of that part of the second member 2B which is placed on the opening 3aB of the hole 3B is locally softened or melted by use of frictional heat; the softened or melted constituent material 2cB of the second member 2B is introduced into the hole 3B of the first member 1B and the depression 55a of the backing member 55 through the opening 3aB of the hole 3B; and the constituent material 2cB of the second member 2B thus introduced into the hole 3B and the depression 55a of the backing member 55 is cured. This makes it possible to easily join the first member 1B and the second member 2B, which are different type of members, at low cost.

Further, in the joining method of Embodiment 5, the linear hole (through hole) 3B is formed in advance in the first member 1B. In view of this, in comparison with the joining methods of Embodiments 3, 4, for example, it is possible to restrain a cost required for the machining of the hole 3B of the first member 1B, thereby yielding such an advantage that a remarkable increase in a manufacturing cost of a product manufactured hereby can be restrained.

Further, for example, in the joining method of Embodiment 3, the hole 3 provided in the first member 1 is reduced in diameter continuously toward the opening 3a on the one surface (the top face), so that the sectional area of the hole 3 along the direction perpendicular to the laminating direction (the axis-Xr direction) is minimized at the opening 3a. In this case, if strength of the first member 1 is low or a thickness of the first member 1 is thin, for example, the opening 3a of the hole 3 may be deformed in the introducing step or the like illustrated in FIG. 3C. In the meantime, in the joining method of Embodiment 5, the hole (through hole) 3B provided in the first member 1B has a linear shape. Accordingly, it is possible to restrain deformation of the opening 3aB of the hole 3B in the introducing step or the like, thereby yielding such an advantage that the first member 1B can be surely joined to the second member 2B.

Note that, similarly to the joining methods of Embodiments 3, 4, a shape (a longitudinal sectional shape and a cross sectional shape) of the hole provided in the first member can be designed appropriately according to joining strength between the first member and the second member, and so on in the joining method of Embodiment 5. Further, a shape of the depression formed in the backing member disposed on the bottom face of the first member can be designed appropriately, provided that the backing member can be easily removed from the bottom face of the first member after the curing step, for example.

Further, as illustrated in FIG. 12, an annular groove 5B' formed around the axis Xr, for example, and communicating with the depression 55a of the backing member 55 may be formed in part of a bottom face 1bB' of a first member 1B' (corresponding to an outer peripheral portion of the depression 55a of the backing member 55 in FIG. 12), and a softened or melted constituent material of a second member may be also introduced into the groove 5B' in the introducing step, and then cured. In this case, it is possible to increase a contact area between the first member 1B' and that constituent material of the second member which is introduced via the hole 3B', and to increase an anchor effect, thereby making it possible to further increase the joining strength between the first member and the second member.

[Embodiment 6]

Embodiments 1 to 5 deal with a configuration in which the first member and the second member having a generally flat shape are joined to each other. However, a shape of each of the members as a joining object can be set appropriately. In a case where the flat-shaped second member is used like Embodiments 1 to 5, when part of the second member is introduced into the hole or the like of the first member in the introducing step, a thickness in the part of the second member is decreased at the time of curing the softened or melted constituent material of the second member so as to join the first member to the second member. In view of this, if the second member includes an extra amount of the material corresponding to the part introduced into the hole or the like of the first member in advance, it is considered that the decrease in the thickness of the second member at the time of joining the first member to the second member can be restrained.

FIG. 13 is a drawing of a longitudinal section to describe Embodiment 6 of the joining method of the present invention: FIG. 13A is a view to describe a laminating step thereof; FIG. 13B is a view to describe a softening-melting step thereof; FIG. 13C is a view to describe an introducing step thereof; and FIG. 13D is a view to describe a curing step thereof. Note that the joining method according to Embodiment 6 is performed by use of the FSW apparatus 50 used in the joining methods according to Embodiments 3 to 5 described above. Embodiment 6 specifically describes a method in which a generally flat-shaped first member 1C made of a metal member, a resin member, a wood material, or the like having a hole 3C formed from one surface (a top face in FIG. 13) 1aC toward the other surface (a bottom face in FIG. 13) 1bC is joined to a second member 2C made of a metal member, a resin member, or the like including a material of which a melting temperature is lower than that of a constituent material of the first member 1C, the second member 2C having a projection 2dC on one surface (a top face in FIG. 13) 2aC thereof.

Similarly to the joining methods according to Embodiments 3 to 5, the joining method according to Embodiment 6 mainly includes a laminating step, a softening-melting step, an introducing step, and a curing step.

First, in the laminating step, the second member 2C is laminated on the first member 1C so that the second member 2C covers an opening 3aC, on the top face 1aC, of the hole 3C provided in the first member 1C and the projection 2dC of the second member 2C is placed generally above the hole 3C, as illustrated in FIG. 13A. Here, the projection 2dC of the second member 2C is formed so as to be placed inside the clamping member 54 of the FSW apparatus 50. More specifically, the projection 2dC is formed so that its top face abuts with the abutting surfaces 11a, 12a of the pin member 11 and the shoulder member 12 of the FSW apparatus 50. Further, the projection 2dC of the second member 2C is formed so that its volume is generally the same as a volume of the hole 3C provided in the first member 1C. Subsequently, the FSW apparatus 50 is positioned and disposed on the top face 2aC of the second member 2C, so that the opening 3aC of the hole 3C of the first member 1C is placed on an axis Xr, in other words, the pin member 11 of the rotating tool portion 51 is placed above the opening 3aC of the hole 3C of the first member 1C and the one surface 2aC of the second member 2C abuts with the abutting surface 54a of the clamping member 54 and a top face of the projection 2dC of the second member 2C abuts with the abutting surfaces 11a, 12a of the pin member 11 and the shoulder member 12. Further, a generally flat-shaped backing member 55 is positioned and disposed so as to cover the opening 3bC, on the bottom face 1bC, of the hole 3C of the first member 1C. Note that the backing member 55 is supported by a support member (not shown), and the second member 2C and the first member 1C are supported in such a manner that the second member 2C and the first member 1C are pressed against the backing member 55 by the clamping member 54.

Then, in the softening-melting step, the pin member 11 and the shoulder member 12 are integrally rotated around the axis Xr, so that a constituent material of the second member 2C including the projection 2dC is softened or melted by use of frictional heat generated between the abutting surfaces 11a, 12a of the pin member 11 and the shoulder member 12 and the top face of the projection 2dC of the second member 2C, as illustrated in FIG. 13B. At this time, the shoulder member 12 is moved downward by a predetermined amount along the axis-Xr direction and the pin member 11 is moved upward along the axis-Xr direction, so that a softened or melted constituent material 2cC of the second member 2C is led below the pin member 11.

Subsequently, the introducing step (see FIG. 13C), and the curing step (see FIG. 13D) similar to those steps in the joining method according to Embodiment 4 are performed, so that the first member 1C and the second member 2C are joined to each other so as to be integrated with each other.

Thus, the joining method of Embodiment 6 is performed such that: the projection 2dC having generally the same volume as the hole 3C of the first member 1C is formed on the one surface (a surface opposite to the abutting surface with the first member 1C) 2aC of the second member 2C is formed; the constituent material of the second member 2C including the projection 2dC is softened or melted in the softening-melting step; and the constituent material of the second member 2C is introduced into the hole 3C and then cured. This makes it possible to surely restrain a decrease in the thickness of the second member 2C at the time when the first member 1C is joined to the second member 2C and to form the one surface 2aC of the second member 2C in a generally flush manner, so that a design characteristic and the like after the joining between the first member 1C and the second member 2C can be increased markedly.

Note that the joining methods according to Embodiments 1 to 6 do not have a limit in types of the members as the joining object in particular. However, the inventor(s) have confirmed that it is preferable that the second member be made of a fiber reinforced resin member configured such that a fiber material is mixed in resin (matrix resin) of which a melting temperature is lower than the constituent material of the first member.

More specifically, in a case where the second member is made of a fiber reinforced resin member configured such that a fiber material is mixed in resin (matrix resin) of which a melting temperature is lower than the constituent material of the first member, the fiber material included in the second member is oriented in a laminating direction (that is, a direction perpendicular to a lamination plane between the first member and the second member) in the vicinity of the opening of the hole (a region R in FIGS. 14A to 14D) in the introducing step, as illustrated in FIGS. 14A to 14D. Then, the matrix resin is cured in that state, thereby making it possible to effectively increase the joining strength between the first member and the second member.

Particularly, in a case where a fiber length of the fiber material contained in the second member is larger than a diameter or the like of the opening of the hole of the first member, the fiber material contained in the second member is oriented surely in the laminating direction in the vicinity of the opening of the hole (that is, the fiber material oriented in the laminating direction is increased), thereby making it possible to more effectively increase the joining strength between the first member and the second member.

Note that in a case where the second member is made of the fiber reinforced resin member, the resin (matrix resin) constituting the second member may be thermo setting resin or thermo plastic resin. Examples of the thermo setting resin include epoxy resin, phenolic resin, melamine resin, and the like. The thermo plastic resin may be, for example, one or more admixtures of polypropylene (PP), polyethylene (PE), polystyrene (PS), AS resin, ABS resin, polyvinylchloride (PVC), methacrylic resin, polyamide (PA), polyester, polyacetal (POM), polycarbonate (PC), polyethylene terephthalate (PET), polybutylene terephthalate (PBT), polymethyl methacrylate (PMMA), polyvinylidene fluoride, polyphenylene oxide, polyphenylene sulfide, poly ether ether ketone, liquid crystal polymer, polyetherimide, polyethersulfone, polyamideimide, thermoplastic epoxy resin, and the like. Further, copolymers mainly containing the thermo plastic resin, and graft resin and blend resin, e.g., an ethylene-vinyl chloride copolymer, a vinyl acetate-ethylene copolymer, a vinyl acetate-vinyl chloride copolymer, an urethane-vinyl chloride copolymer, acrylic acid modified polypropylene, maleic acid modified polyethylene, and the like can be also introduced.

Further, the reinforcement fiber material constituting the second member may be, for example, one or more admixtures of ceramic fibers such as boron, alumina, silicon carbide, silicon nitride, and zirconia, inorganic fibers such as glass fiber and carbon fiber, metal fibers such as copper, steel, aluminum, and stainless, and organic fibers such as polyamide, polyester, and cellulose.

Further, in Embodiments 1 to 6, in order to join the first member having a hole to the second member including the material of which a melting temperature is lower than that of the constituent material of the first member, the joining apparatus including a heater or the friction stir welding apparatus is used. However, any apparatus can be used provided that the constituent material of the second member can be softened or melted and the softened or melted constituent material of the second member can be introduced into the hole of the first member. The constituent material of the second member may be softened or melted by use of heat generation by supersonic vibration or by use of a hot plate heated in advance, or the like, instead of frictional heat. Further, similarly to Embodiments 1, 2, Embodiments 3 to 6 may be performed such that the second member is placed on the first member without using a pushdown force by an apparatus or the like, and the softened or melted constituent material of the second member is introduced into the hole of the first member only by gravity.

Further, Embodiments 1, 2 deal with a configuration in which the first member is joined to the second member through a plurality of steps including the laminating step, the softening-melting/introducing step, and the curing step, and Embodiments 3 to 6 deal with a configuration in which the first member is joined to the second member through a plurality of steps including the laminating step, the softening-melting step, the introducing step, and the curing step. However, needless to say, the constituent material of the second member may be introduced into the hole of the first member through the opening of the hole while the constituent material is being softened or melted, and the constituent material of the second member may be cured in the hole of the first member while the constituent material is being introduced into the hole.

Thus, the embodiments of the present invention have been described with reference to the drawings, but concrete configurations of the present invention are not limited to the above embodiments. Even if there are changes of design or the like within a range that does not deviate from a gist of the present invention, they are included in the present invention.

The invention claimed is:

1. A joining method for joining a first member having a hole that is opened on at least one surface, to a second member made of a fiber reinforced resin member configured such that a fiber material is mixed in resin of which melting temperature is lower than that of a constituent material of the first member, the joining method comprising:
    laminating the second member on the first member so as to cover a first opening of the hole;
    orienting the fiber material contained in the second member in a laminating direction while softening or melting of the resin of the second member above the first opening of the hole;
    introducing the fiber reinforced resin member resin mixed with the resin softened or melted into the hole through the first opening by pushing the fiber reinforced resin member resin; and
    curing the resin introduced into the hole.

2. The joining method according to claim 1, wherein:
    the second member includes the fiber material whose length is longer than a diameter of the first opening of the hole.

3. The joining method according to claim 1, wherein:
    the hole of the first member has a reduced diameter portion reduced in diameter continuously or in a stepped manner toward the first opening.

4. The joining method according to claim 3, wherein:
    a sectional area of the hole of the first member along a direction perpendicular to the laminating direction is minimized at the first opening.

5. The joining method according to claim 1, wherein:
    the hole of the first member is formed so as to penetrate from the one surface to the other surface opposite to the one surface.

6. The joining method according to claim 5, wherein:
    a backing member configured to cover a second opening of the hole which is formed on the other surface is disposed.

7. The joining method according to claim 6, wherein:
    the backing member includes a depression communicating with the hole via the second opening of the hole which is formed on the other surface and configured such that a sectional area of the depression along the direction perpendicular to the laminating direction is larger than that of the second opening on the other surface; and
    in the introducing and curing of the resin of the second member, the resin of the second member is introduced into the depression as well as the hole, and then cured.

8. The joining method according to claim 1, wherein:
    in the introducing and curing of the resin of the second member, the resin of the second member is softened or melted by use of frictional heat.

* * * * *